United States Patent [19]

Voecks

[11] Patent Number: 4,909,808
[45] Date of Patent: Mar. 20, 1990

[54] STEAM REFORMER WITH CATALYTIC COMBUSTOR

[75] Inventor: Gerald E. Voecks, La Crescenta, Calif.

[73] Assignee: The United States of America as represented by the Administrator of the National Aeronautics and Space Administration, Washington, D.C.

[21] Appl. No.: 108,341

[22] Filed: Oct. 14, 1987

[51] Int. Cl.⁴ .................................................. B01J 7/00
[52] U.S. Cl. .................................... 48/94; 48/196 A; 422/197; 422/198; 422/200; 422/211
[58] Field of Search .................... 48/196 A, 94, 105; 422/197, 191, 204, 211, 148, 200, 212, 210, 198

[56] References Cited

U.S. PATENT DOCUMENTS

| | | | |
|---|---|---|---|
| 1,959,151 | 5/1934 | Beekley | 422/602 |
| 3,031,274 | 4/1962 | Schober . | |
| 3,372,988 | 3/1968 | Hansen . | |
| 3,475,136 | 10/1969 | Eschenbrenner et al. . | |
| 3,541,729 | 11/1970 | Dantowitz | 48/94 |
| 3,843,561 | 10/1974 | Sobel . | |
| 3,871,838 | 3/1975 | Henkel et al. | 48/107 |
| 3,909,299 | 9/1975 | Corrigan | 48/94 |
| 3,918,918 | 11/1975 | Kohn et al. . | |
| 3,996,025 | 12/1976 | Gulden | 48/107 |
| 4,098,587 | 7/1978 | Krar et al. | 48/94 |
| 4,108,218 | 8/1978 | Estes et al. . | |
| 4,230,669 | 10/1980 | Eagle et al. . | |
| 4,337,178 | 6/1982 | Atwood et al. . | |
| 4,594,227 | 6/1986 | Ohsaki et al. . | |
| 4,692,306 | 9/1987 | Minet et al. | 48/94 |

Primary Examiner—Peter Kratz
Attorney, Agent, or Firm—Thomas H. Jones; John R. Manning; Charles E. B. Glenn

[57] ABSTRACT

A steam reformer is disclosed having an annular steam reforming catalyst bed formed by concentric cylinders and having a catalytic combustor located at the center of the innermost cylinder. Fuel is fed into the interior of the catalytic combustor and air is directed at the top of the combustor, creating a catalytic reaction which provides sufficient heat so as to maintain the catalytic reaction in the steam reforming catalyst bed. Alternatively, air is fed into the interior of the catalytic combustor and a fuel mixture is directed at the top. The catalytic combustor provides enhanced radiant and convective heat transfer to the reformer catalyst bed.

3 Claims, 4 Drawing Sheets

STEAM REFORMER WITH CATALYTIC COMBUSTOR

BACKGROUND OF THE INVENTION

1. Origin of the Invention

The invention described herein was made in the performance of work under a NASA contract, and is subject to the provisions of Public Law 96-517 (35 U.S.C. §202) in which the Contractor has elected not to retain title.

2. Field of the Invention

This invention relates to steam reforming of hydrocarbons, such as involved with fuel cell power plants, ammonia synthesis units, methanol synthesis units, and other industrial operations. More particularly, this invention relates to an annular steam reformer having a catalytic combustor for efficient control of heat transfer from the catalytic combustor to the catalyst bed of the steam reformer.

3. Description of the Related Art

Steam reforming of hydrocarbons involves the transfer of heat into a steam reforming catalyst bed, through which the steam and hydrocarbon feed gases are passed. This process requires high thermal efficiency. When the catalyst bed is maintained at the required temperature, a catalytic reaction takes place in the feed gases and results in the production of the desired hydrogen-rich gas mixture. The steam reforming catalyst bed is contained within a reactor tube. Heat transfer into the steam reforming catalyst bed is a function of the means by which the heat is sppplied to the reactor tube surface: either by indirect or direct means.

Indirectly fired combustors are commonly used; in such combustors, heat transfer into the catalyst bed can be enhanced, and thermal efficiency increased, by designing the reactor tube to provide a high surface area over which hot gases can flow. The tube diameter is limited by the radial distance through the steam reforming catalyst bed across which heat must be transferred. Alternatively, small diameter reactor tubes can be used to reduce the radial distance across which heat must be transferred, correspondingly adding to the tube length to provide the necessary overall heat transfer surface area. Various designs for channeling hot gases around the catalyst reactor tube can be used by which the heat energy is transferred into the catalyst bed by convective heat transfer. Any combination of these and similar approaches commonly used in industry will enhance the thermal efficiency of the steam reformer.

Alternatively, directly fired combustors can be used to provide heat to the reactor tube walls. Directly fired combustors locate the heat-generating combustion process in close proximity to the reactor tube walls, which increases radiant heat transfer to the walls. Typically, however, when many smaller diameter reactor tubes are incorporated into a single reactor system, heat transfer by radiation is severely limited. Thus, convection and conduction are still the primary means of transferring heat into the catalyst bed. Application of a direct fired combustor to a reactor tube design that incorporates an annular catalyst bed provides the advantages of high tube surface area and utilization of both radiant and convective heat transfer mechanisms.

U.S. Pat. No. 4,230,669 discloses an indirectly fired ammonia converter system including first and second heat interchanges and first, second, and third catalyst beds. The first and second catalyst beds are of an annular configuration for radially inward flow of a heated synthesis gas. The system is indirectly fired and includes a structure containing the first and second heat interchange, which are used to heat the synthesis gas. A conduit and domed chamber are used to direct the gas from an axial flow through the heat interchangers to a radial flow through the first and second catalyst beds. A separate structure containing the third catalyst bed completes the system. Because the system is indirectly fired, it depends primarily on convective heat transfer.

U.S. Pat. No. 4,594,227 discloses a reactor in which a feed gas is caused to flow radially through a catalyst bed packed in an annular space defined by two coaxial cylinders having different diameters. A vertically extending, annular, inter-cylinder space, defined between an outer catalyst retainer cylinder and an inner catalyst retainer cylinder, is divided into a plurality of chambers by radially extending vertical partition walls. Heat exchanging tubes are disposed vertically in the chambers for maintaining the proper temperature for the catalytic reaction. A catalyst is packed in the chambers, forming reaction chambers through which a feed gas flows in radial directions. The heat exchangers make it apparent that this reactor, too, is indirectly fired and depends on convective heat transfer.

SUMMARY OF THE INVENTION

The present invention provides a steam reformer contained within a cylindrical structure having a catalytic reactor tube of annular shape. Rather than using an external heating device to bring hot gases into the reactor tube, the present invention utilizes a novel catalytic combustor located at the center of the cylindrical structure. Thus, two different catalytic reactions are taking place: one reaction common to catalytic reaction tubes of steam reformers, and a second reaction for creating the heat required for the steam reformer. This internal placement of the heat source and use of a catalytic combustor greatly enhances heat transfer by both radiation and convection. The improvement in these characteristics is primarily due to the ability to control the heat flux (the amount of heat available from the fuel on the outside of the reactor tube) so as to match the amount of heat required by the reaction taking place inside the catalyst bed with the heat and temperature of the combustion gas outside the reactor. The use of a catalytic combustor allows a variety of configurations to optimize the operation of the reformer and also allows a variety of configurations unique to catalytic combustion. For example, various configurations of catalyst loading, catalyst type, combustor surface geometry and surface area, and support matrix composition may be selected.

In the present invention, a steam reformer having a catalytic combustor is disclosed in which the catalytic combustor is a fibrous material composed of alumina, silica, or other similar and commonly used oxide material. It also can employ a "sponge" type of material which can be metallic or oxide material with varying, but generally small pore, high porosity material. Examples are tungsten metal "sponge" and alumina oxide "sponge". Air and fuel are directed into the combustor and a catalyst initiates the combustion reaction. The catalyst is applied on the outer portion of the fibrous shell or sponge cylinder, where the air and fuel contact the catalyst, thereby promoting the catalytic combustion on the outside of the combustor. Thus, the reactor tube is designed as an annulus, with an internal catalytic combustor supplying the heat to the annular reactor surface.

In the present invention, the required annular spaces are formed by coaxial cylinders of different diameter. The catalytic combustor is located in the center of the cylinders. The inner cylinder forming the catalytic combustor is composed of a fibrous or sponge material, the inner cylinder receiving combustion feed gases from one end and being fed through the combustor to the outside wall for combustion, which may be at the other end or selectively over the length of the combustor. One method of operation involves feeding a gaseous or gasified fuel, or an air/fuel pre-mix, into the interior of the combustor. The fuel or fuel/air pre-mix then diffuses out through the catalyzed fiber or sponge forming the combustor wall. An appropriate amount of air to provide the desired air/fuel ratio is then directed onto the walls of th fibrous or sponge shell from the opposite end of the combustor. An alternate method of operation involves feeding the air or air/fuel pre-mix into the interior of the combustor and the fuel, or balance of fuel, being fed over the outside surface of the catalyzed fiber from the opposite end so as t provide the desired air/fuel ratio. In either case, combustion taking place on the combustor wall will radiate heat onto the steam reformer catalyst bed wall. In addition, the hot combustion products will flow through a narrow annulus between the combustor wall and the steam reformer wall and will connectively transfer additional heat to the steam reformer wall. Thus, heat transfer is achieved by both radiation and convection.

The control of heat transfer from the catalytic combustor to the steam reformer walls can be maintained by carefully selecting the area of combustion relative to the area of steam reforming activity. Typically, heat flux requirements are such that the heat energy required at the exit end of the steam reformer catalyst bed for reaction is not high, because the majority of the fuel has been converted in the lower inlet portions of the steam reforming catalyst bed. The temperature of the steam reforming reaction product gases, however, must be raised to increase the conversion. This is dictated by the principles of thermodynamic equilibrium. In order to achieve this, the catalytic combustor may be located at the exit end of the steam reformer catalyst bed where the controlled heat release is commensurate with th thermal duty of the steam reforming reaction. As a result of maintaining substantial combustion at the steam reforming catalyst bed exit, the heat radiation of the combustion can directly impact the steam reforming reaction within the catalyst bed and supply the necessary heat required to raise the temperature of the reacting gases in the annulus to the desired final (1500 to 1700 degrees Fahrenheit) temperature. This can be accomplished without overheating the reactor tube or any of the surrounding materials because the catalytic combustor can be controlled to provide the necessary heat release at this location. Additional control may be provided by varying the amount of catalyst on the surface of the combustor fiber or sponge, varying the porosity (and hence the pressure differential) of the combustor fiber or sponge, proper selection of length and diameter for the combustor, and appropriate air/fuel ratios which in turn are controlled by the internal and external feed gas compositions and flow rates.

After combustion has taken place at the catalytic combustor wall, the gaseous combustion products flow through the annulus adjacent to the steam reforming catalyst bed. The heat transfer required for maintaining the steam reforming reaction to take place in the reaction tube is controlled by the appropriate size of annulus through which the combustion gases flow. In order to enhance the convective heat transfer required, the reformer may incorporate fins, porous metal or ceramic-type sponge or fiber in the combustion gas annulus or the annulus may be varied in diameter or thickness, i.e. it may be given a "funnel" shape, to alter the combustion gas velocity. The material used or annulus thickness should be varied to match the system pressure drop as well as the heat transfer requirements.

DETAILED DESCRIPTION OF THE DRAWINGS

Figure 1:
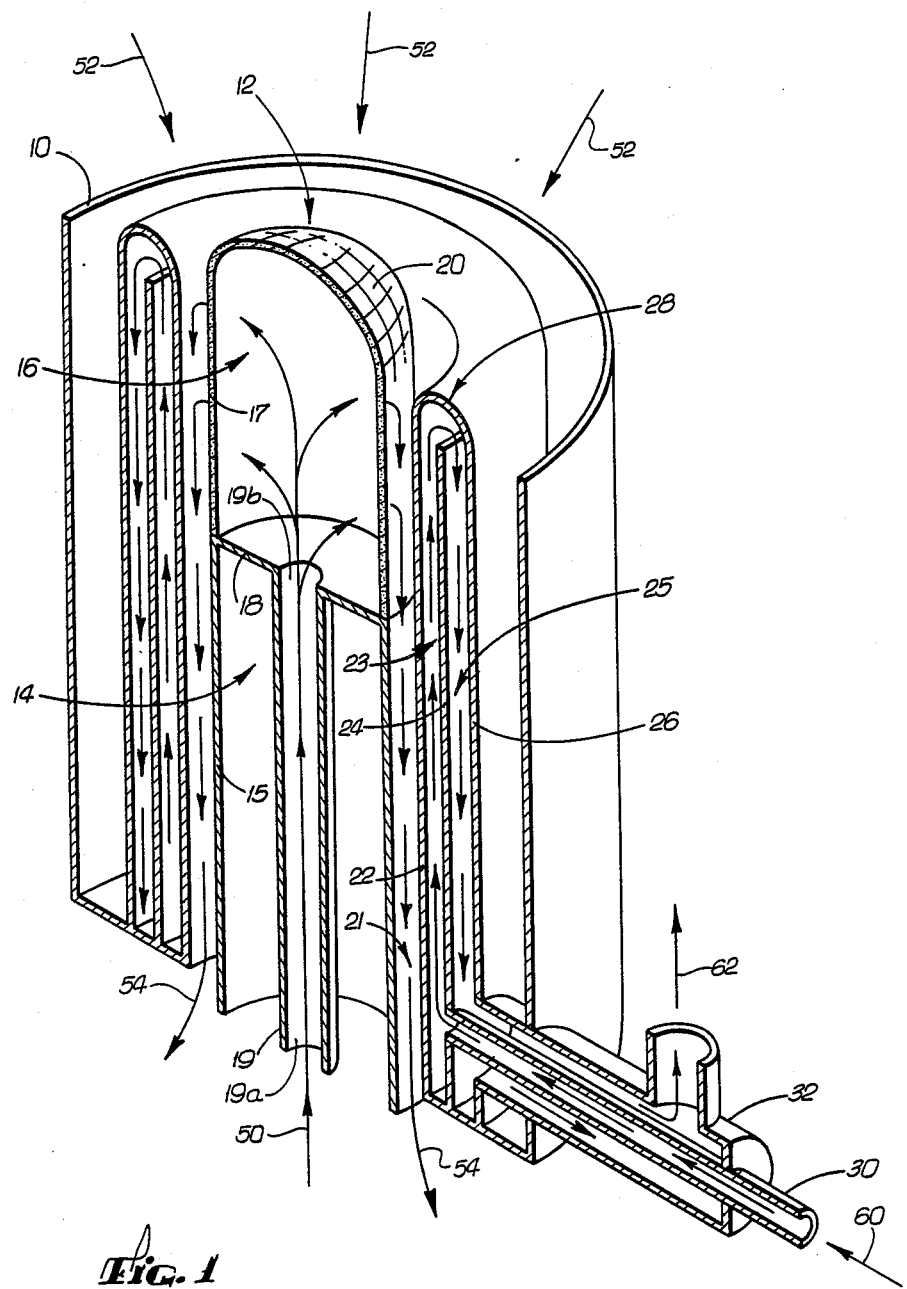
FIGS. 1, 2, 3, and 4 are perspective sectional views of alternate embodiments of the present invention.

FIG. 1 is a perspective sectional view of a steam reformer reactor in accordance with the present invention. The reformer reactor includes an outer containment wall 10 with a catalytic combustor 12 located in the center. The catalytic combustor 12 is formed in the shape of a cylinder or shell, which may be domed, and is segmented into two parts comprising a lower cylindrical segment 14 and an upper fibrous segment 16. The lower cylindrical segment is composed of a cylindrical a wall 15 that is closed at one end by a flat plate 18. An inlet feed distributor 19 runs axially inside the lower cylindrical segment 14, from one open end of the cylinder 19a to the other, ending in an inlet hole 19b in the center of the plate 18. The inlet feed distributor 19 provides for the introduction of (1) fuel, (2) air/fuel premix or (3) air into the catalytic combustor in the direction indicated by arrow 50. The upper segment 16 of the catalytic combustor is comprised of a fibrous cylinder wall 17 that is of substantially the same diameter as the lower cylindrical wall 15 and which rests on the plate 18, and a fibrous dome pottion 20. The fibrous dome and wall are coated with a catalyst for promoting a catalytic combustion. Control for partitioning the distribution of the gas flow inside the fibrous cylinder can be included to regulate over the length of he cylinder the amount of gas flowing through the wall. This can also be achieved by varying the porosity and/or thickness of the fibrous cylinder wall. The balance of (1) air, (2) fuel/air premix or (3) fuel to maintain the desired combustion conditions is added from the top down onto the catalytic combustor from the direction of the arrows 52. The catalytic combustion products flow out in the direction of the arrows 54.

Between the outer containment wall 10 and the catalytic combustor 12 are located a series of cylindrical walls forming annular spaces. Moving radially outward from the catalytic combustor 12 toward the outer containment wall 10, the first cylinder wall is an inner steam reformer wall 22, thereby defining a combustor annular space 21 located between the combustor 12 and inner steam reformer wall 22. The next wall is an outer steam reformer wall 24. The inner wall 22 and outer wall 24 define a steam reformer annular space 23 or catalyst bed containing a steam reforming catalyst. The next wall out is an inner containment wall 26. The annular space 25 formed by the outer steam reformer wall 24 and the inner containment wall 26 is an empty space or contains a high temperature shift catalyst. A curved portion 28 joins the inner steam reformer wall 22 and the inner containment wall 26, thereby allowing the catalyst bed 23 to communicate with the annular space 25 at one end.

The steam reformer reactor of the present invention also includes inlet and outset conduits for the steam reformer proper. FIG. 1 shows a feed gas inlet conduit 30 that conducts steam and methane, propane, naphtha, or other similar hydrocarbon feed stock in the direction indicated by the arrow 60 into the steam reformer catalyst bed 23. The inlet conduit 30 passes through the outer containment wall 10, the inner containment wall 26, and through the outer steam reformer wall 24, opening into the catalyst bed 23. Once in the catalyst bed, the feed gases travel up toward the curved portion 28 joining the inner reformer wall 22 and the inner containment wall 26. The feed gases thus pass from the catalyst bed 23 into the annular space 25. A catalytic reaction takes place while the feed gases are traveling through the catalyst bed. After the feed gases enter the annular space 25 located between the outer steam reformer wall 24 and inner containment wall 26, hey are evacuated from the annular space through a reactant product outlet conduit 32 in the direction of the arrow 62. The outlet conduit 32 is illustrated as a conduit axially surrounding the inlet conduit 30. The reactant product outlet conduit 32 contains the gases that result from the desired catalytic reaction, which gases consist of hydrogen, oxides of carbon, methane, and steam.

Additional heat release control from the catalytic combustor can be supplied in the preferred embodiment illustrated in FIG. 1. The separation of the upper segment of the combustor from the lower segment allows a secondary supply of fuel, air/fuel premix or air to be fed into the lower segment and into the combustor annular space 21 in addition to the like substances that are introduced into the interior of the upper segment 16 of the fibrous catalytic combustor. In this way, further combustion can be maintained at the lower inlet portion of the steam reformer catalyst bed 23 that would supply the heat energy required to promote the steam reforming reaction. The heat requirement is highest at this location due to the high heat of reaction during the inlet segment of steam reforming reactors. The amount of heat that would be supplied in this secondary approach would be mediated by the total heat which can be transferred and how much heat would be lost by the exiting combustion gas stream. The efficiency of the unit is a function of the exiting gas heat content and, if the efficient recovery requires additional heat exchanging outside the reactor, the overall efficiency improvement offered by using catalytic combustion may be sacrificed.

Introduction of secondary fuel into the combustor interior would be advantageous, for example, in the case where the air being added at the to of the combustor is at a higher than stoichiometric air/fuel ratio. As the heat released at the top of the combustor is transferred to the steam reformer catalyst bed, the temperature of the combustion gas decreases. As the combustion gas passes downward and transfers additional heat into the steam reformer catalyst bed, a secondary addition of fuel through the catalytic fiber combustor at the lower end would raise the temperature on the steam reformer tube wall and in the combustion gases. This additional heat would be consumed in part by the steam reforming reaction and the reminder would be carried onward with the combustion gases. As one option, this heat would be recovered in preheating the air that is then introduced into the top of the reactor.

Figure 2:
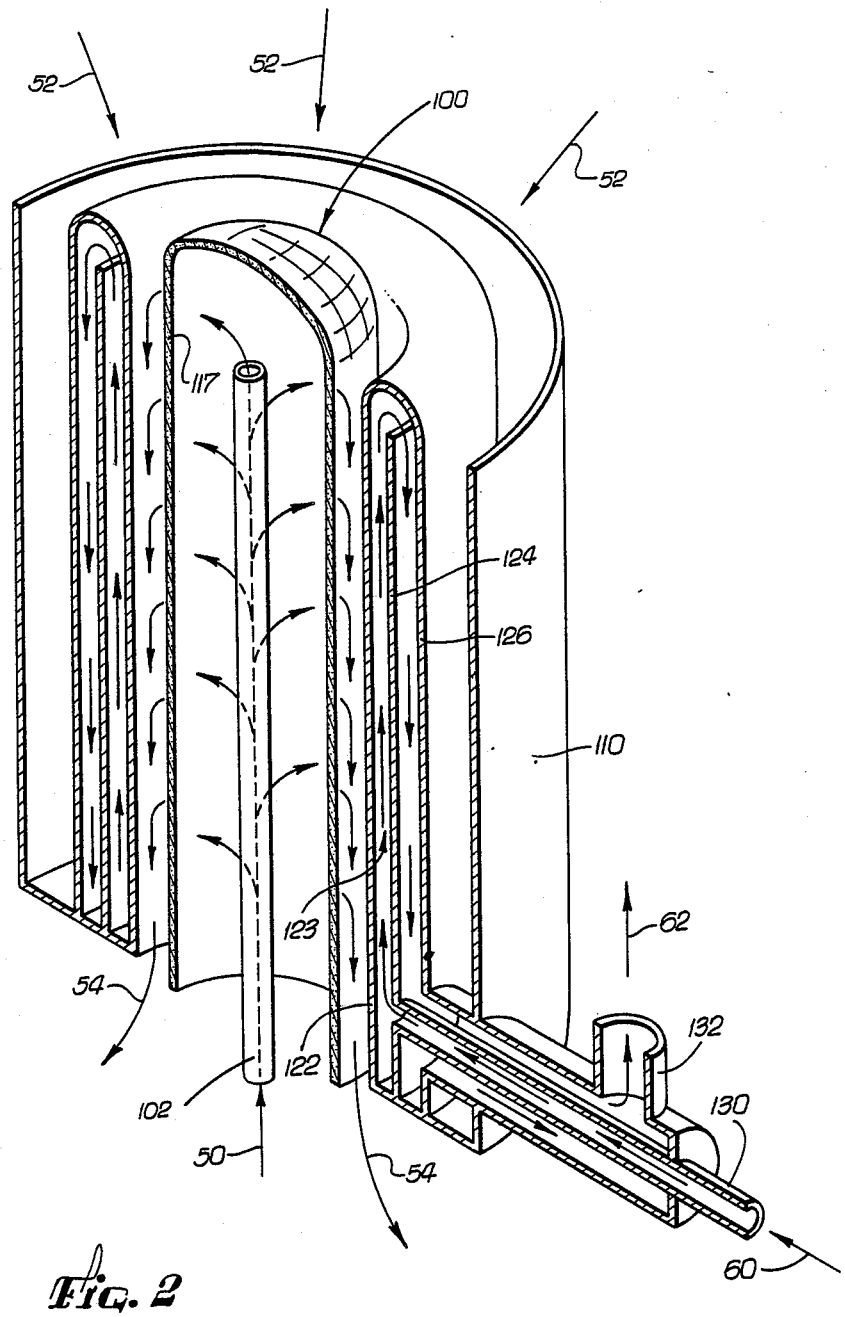

FIG. 2 illustrates another option for the design of the catalytic combustor. The fibrous combustor 100 of FIG. 2 is similar to the catalytic combustor 12 of FIG. 1 except that the combustor 100 is not segmented. Instead, the fibrous shell 117 extends the full length of the combustor 100 and the inlet flow of (1) fuel, (2) air/fuel mix or (3) air is segmented over the length of the combustor by the inlet feed distributor 102 located in the center of the combustor. A catalyst for promoting a catalytic combustion is applied to the outer surface of the fibrous shell. The remaining structure shown in FIG. 2 is analagous to that shown in FIG. 1. Structures in FIG. 2 that are analagous to particular structures in FIG. 1 are identified by reference numerals having the same last two digits as the reference numerals identifying the particular structure in FIG. 1. In FIG. 2, feed gases enter the inlet conduit 130 in the direction of the arrow 60 and pass through the outer containment wall 110, inner containment wall 126, an outer steam reformer wall 124 and into the catalyst bed 123 located between the inner reformer wall 122 and outer reformer wall 124. Reactant gases are removed through conduit 132 in the direction indicated by the arrow 62.

The inlet feed distributor 102 is designed in such a way that the appropriate amount of fue, air/fuel mixture or air is delivered over the length of the combustor. Appropriate methods of distribution may comprise varying the diameter of the distributor or varying the size of distribution openings in the distributor. The amount of the respective gases delivered by the inlet feed distributor 102 is coordinated with the flow of the corresponding (1) air, (2) fuel/air mix or (3) fuel from the top end of the combustor and with the heat requirements of the steam reformer along the length of the reactor tube.

Figure 3:
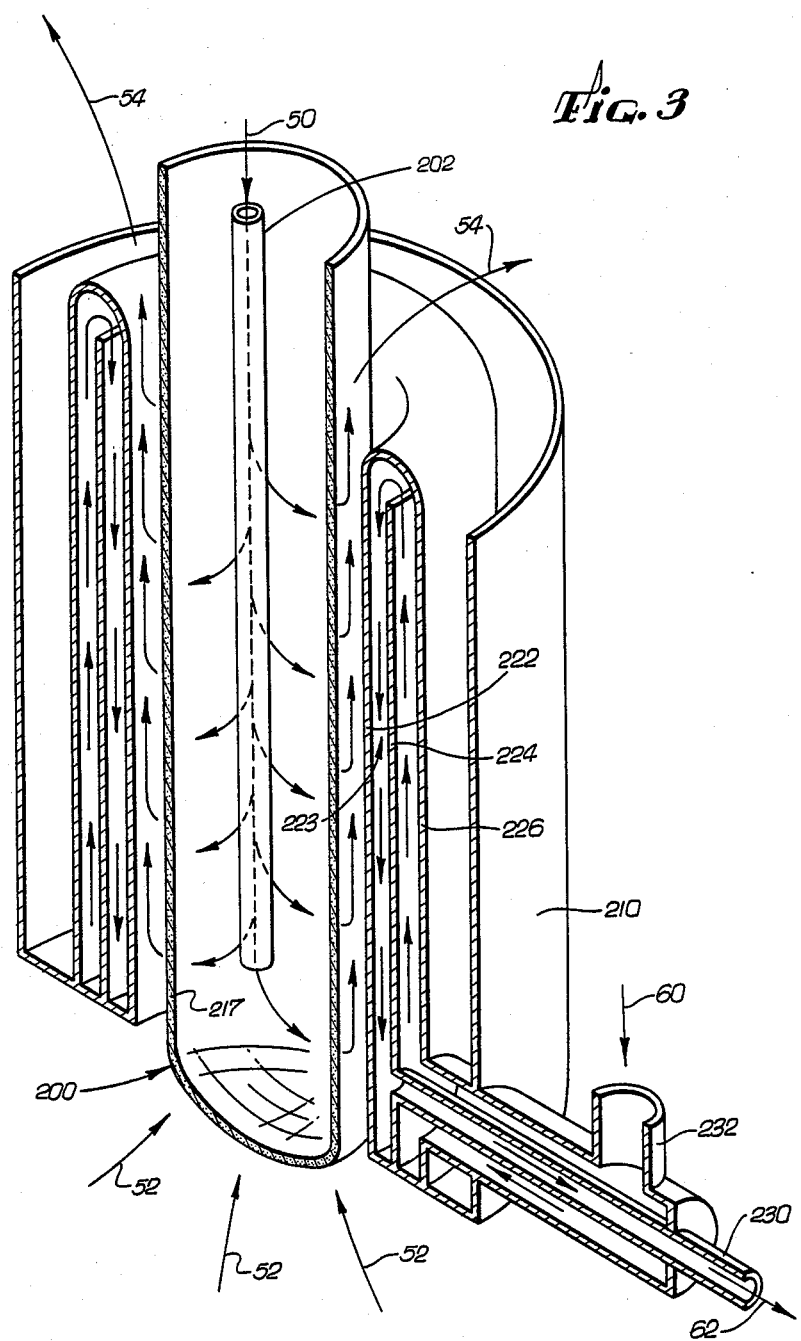

FIG. 3 shows a further option to the concept shown in FIG. 2 and may be described as the inverse configuration of FIG. 2. Again, similar structures between the two FIGURES are identified by reference numerals having the same last two digits. The fibrous shell 217 extends the length of the combustor 200, and a catalyst is applied to the outer surface of the shell, where air and fuel contact the catalyst and promote the catalytic combustion. An inlet feed distributor 202 is located in the center of the combustor, distributing the appropriate amount of fuel, air/fuel mixture or air over the length of the combustor. In addition to inverting the combustor compared to that of FIG. 2, the design of FIG. 3 reverses the flow of the feed gases and reactant gases. The feed gases are introduced into a conduit 232 indicated by the arrow 60 and flow into the catalyst bed 223 located between the inner 222 and outer 224 steam reformer walls. Reactant gases are removed through a conduit 230 in the direction indicated by arrow 62.

By inverting the fibrous combustor 200, the appropriate flow amount and direction, as well as gas composition through the fiber, may be maintained. Excluding an air/fuel mixture as a feed gas, four possible flow combinations exist for each of the illustrations shown in FIGS. 1 and 2 through the interior of the catalytic combustor. In order to select the appropriate configuration and flow combinations, a specific catalyst activity, reactor diameter, reactor length, catalytic combustor activity, and external heat exchange option must be specified. Since these variables exist, however, no particular design can be recommended over the others.

The preferred system of combustor and steam reformer includes air flow outside the combustor in counterflow to the direction of the steam reforming reactants.

In place of the fibrous catalytic combustor, a "sponge" configuration of catalyst support material may be employed. The function of the combustor would be basically as described for the fibrous catalytic combustor. This material is more rigid than the fibrous unit, but is capable of being shaped to the same desired configuration a the fibrous unit, which includes other than just cylindrical. Furthermore, the "sponge" may allow for alternate methods of distributing the (1) fuel, (2) air/fuel premix or (3) air over the length of the combustor unit, due to its structural rigidity. The catalyst, which may be bound to a washcoat on the sponge and loaded to varying amounts, may also be located nearer the outside of the cylinder in order to promote combustion on the outside circumference.

Figure 4:
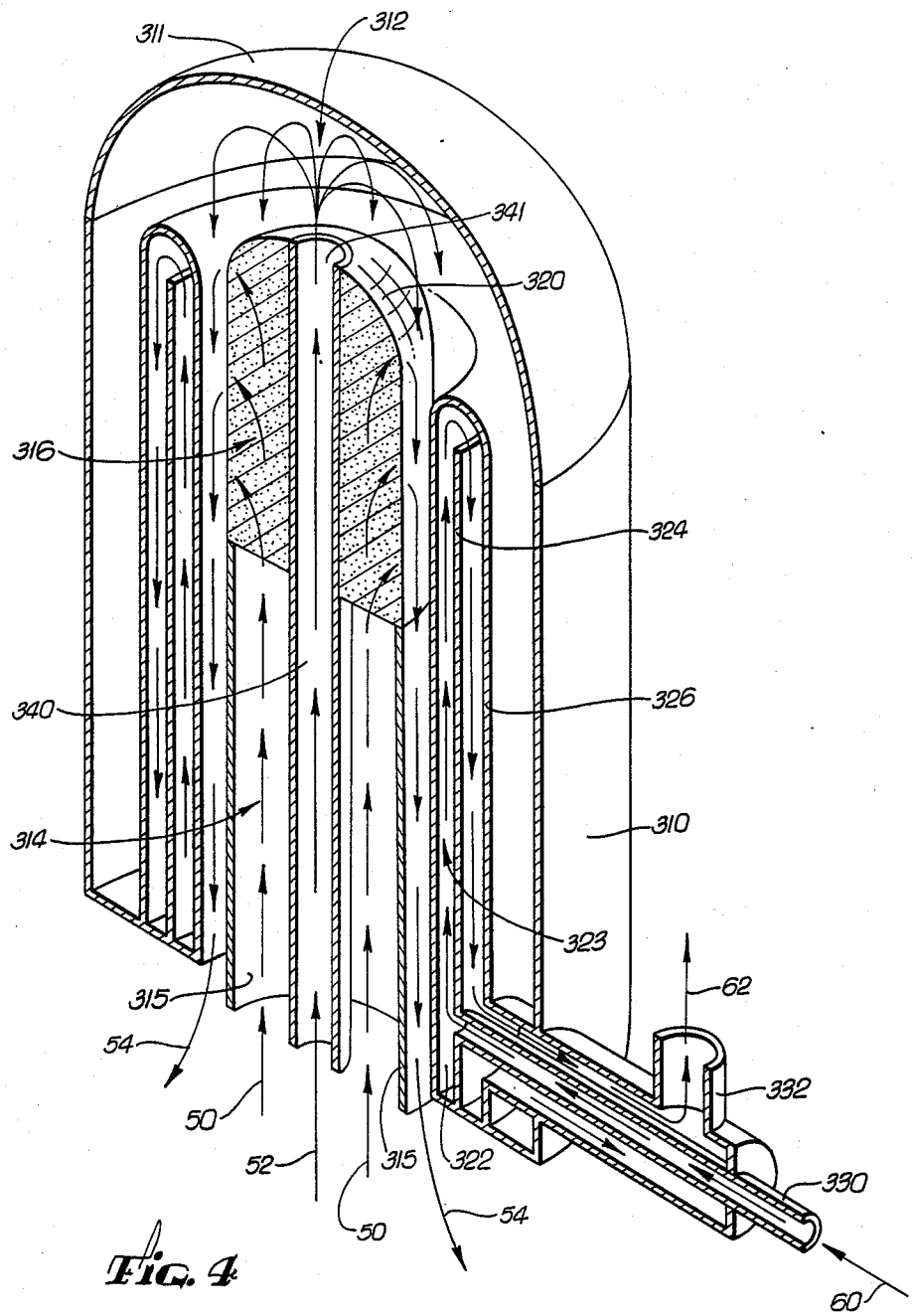

Another option is to take the configuration of FIG. 1 and enclose the top of the steam reformer and combustion unit as shown in FIG. 4. The outer containment wall 310 extends over the combustor in a dome 311. The centrally located combustor 312 is illustrated as a cylinder segmented into two parts, a lower segment 314 and an upper segment 316, similar to the combustor 12 of FIG. 1. The lower segment 314 includes a cylinder wall 315. A central tube 340 passes from the bottom of the combustor, through the lower segment and upper segment, and ends at an opening 341 in the center of the top dome 320 of the upper segment. This allows for the introduction of the (1) air, (2) fuel/air premix balance or (3) fuel, which in the previous description would be introduced from the top, to enter the combustion chamber surrounding the fibrous or sponge catalyst from the center tube 340 indicated by the arrow 52.

The gas flow from the centrally located tube would impinge on the top and flow down onto the catalytic combustor which has (1) fuel, (2) air/fuel premix or (3) air as required to meet the steam reformer operating conditions. This option also applies to the alternate configurations shown in FIGS. 2 and 3 by capping the end of the unit and locating a central tube through the length of the catalytic combustor for the introduction of required gases as stated above. The cross-hatching in the upper segment 316 of FIG. 4 is meant to indicate a sponge catalyst rather than the previously illustrated fibrous catalytic combustors. The feed gases indicaed by arrow 60 enter the steam reformer through an inlet conduit 330 and pass through the outer 310 and inner 326 containment walls to the catalyst bed 323 located between the inner 322 and outer 324 steam reformer walls. The reactant gases exit through an outlet conduit 332.

Yet another option for operation is to provide for the flow of steam reforming gases to be in a co-current direction wit the combustion flow. This would apply in particular to methanol steam reforming and would involve the entry and exit of reactant and product gases, respectively, from the steam reformer to be in the opposite direction to that described for FIG. 1 above.

The foregoing disclosure and description of the invention are illustrative and explanatory only, and various changes in the size, shape, and materials as well as in the details of the illustrated construction may be made without departing from the spirit of the invention.

What is claimed is:

1. A catalytic steam reformer reactor having a steam reformer for combning a synthesis feed gas introduced into a first catalyst bed of the steam reformer with heat so as to produce catalytic reactant gases in the first catalyst bed, and a combustor for supplying heat to said steam reformer, said steam reformer comprising:

inner and outer cylindrical reformer walls defining a cylindrical reaction annulus in which a catalytic steam reformer reaction takes place;

a feed gas conduit connected to the outer reformer wall for directing a synthesis feed gas through the outer cylindrical reformer wall and into the first catalyst bed in a radial flow and axial flow; and a reactant gas conduit communicating with the cylindrical reaction annulus for directing catalytic reacant gasses from the first catalyst bed and out of the steam reformer; and said combustor comprising:

a generally cylindrical catalytic combustor located centrally within the steam reformer in the area bounded by the inner reformer wall and having a combustion catalyst for producing a catalytic combustion reaction, the reaction thereby providing sufficient heat to the first catalyst bed by heat radiation and convection so as to maintain the catalytic steam reformer reaction; and a fuel conduit connected to the catalytic combustor for directing a fuel and air mixture to the combustion catalyst, thereby starting and promoting the catalytic combustion reaction, wherein the catalytic combustor further compises:

a cylinder located in the center of the inner steam reformer wall, the cylinder having a fibrous shell through which gases may flow, with the combustion catalyst material applied to its outer surface for promoting the catalytic combustion reaction; and wherein said fuel conduit comprises a conduit for introducing an air and fuel mixture onto the interior of the fibrous cylindrical shell and means for directing a complementary stream of air, or fuel and air mixture at the exterior of the fibrous cylindrical shell, the air and fuel combining with the combustion catalyst and promoting the catalytic combustion reaction in the catalytic combustor.

2. A catalytic steam reformer reactor having a steam reformer for combining a synthesis feed gas introduced into a first catalyst bed of the steam reformer with heat so as to produce catalytic reactant gases in the first catalyst bed, and a combustor for supplying heat to said steam reformer, said steam reformer comprising:

inner and outer cylindrical reformer walls defining a cylindrical reaction annulus in which a catalytic steam reformer reaction takes place;

a feed gas conduit connected to the outer reformer wall for directing a synthesis feed gas through the outer cylindrical reformer wall and into the first catalyst bed in a radial flow and axial flow; and a reactant gas conduit communicating with the cylindrical reaction annulus for directing catalytic reactant gasses from the first catalyst bed and out of the steam reformer; and said combustor comprising:

a generally cylindrical catalytic combustor located centrally within the steam reformer in the area bounded by the inner reformer wall and having a combustion catalyst for producing a catalytic combustion reaction, the reaction thereby providing sufficient heat to the first catalyst bed by heat radiation and convection so as to maintain the catalytic steam reformer reaction; and a fuel conduit connected to the catalytic combustor for directing a fuel and air mixture to the combustion catalyst, thereby starting and promoting the catalytic combustion reaction, wherein the catalytic combustor further comprises:

a cylindrical shaped sponge located in the center of the inner steam reformer wall, the sponge having the combustion catalyst material applied to its outer surface for promoting the catalytic combustion reaction; and wherein said fuel conduit comprises a first conduit for directing a fuel and air mixture at the inner surface of the cylindrical sponge and means for directing a complementary stream of air, or fuel and air mixture at the outer surface of the cylindrical sponge, the air and fuel combining with the combustion catalyst material and promoting the catalytic combustion reaction in the catalytic combustor.

3. The steam reformer of claim 2 in which the means for directing the complementary stream comprises a second conduit passing through the first conduit and through the center of the cylindrical sponge to the sponge top outer surface such that the complementary air and fuel mixture is directed onto the outer surface of the sponge.

* * * * *